United States Patent
Chamayou et al.

(10) Patent No.: US 9,475,892 B2
(45) Date of Patent: Oct. 25, 2016

(54) POLYMERIZATION PROCESS

(75) Inventors: Jean-Louis Chamayou, Carry le Rouet (FR); Benoit Sibourd, Peyrolles en Provence (FR)

(73) Assignee: INEOS SALES (UK) LIMITED, Lyndhurst, Hampshire (GB)

( * ) Notice: Subject to any disclaimer, the term of this patent is extended or adjusted under 35 U.S.C. 154(b) by 759 days.

(21) Appl. No.: 13/695,370

(22) PCT Filed: Apr. 13, 2011

(86) PCT No.: PCT/EP2011/055856
§ 371 (c)(1),
(2), (4) Date: Nov. 5, 2012

(87) PCT Pub. No.: WO2011/134797
PCT Pub. Date: Nov. 3, 2011

(65) Prior Publication Data
US 2013/0046070 A1    Feb. 21, 2013

(30) Foreign Application Priority Data

Apr. 30, 2010  (EP) .................................... 10161590

(51) Int. Cl.
| | | |
|---|---|---|
| C08F 10/00 | (2006.01) | |
| C08F 2/00 | (2006.01) | |
| C08F 2/34 | (2006.01) | |
| C08F 2/38 | (2006.01) | |
| B01J 8/24 | (2006.01) | |
| C08F 210/16 | (2006.01) | |

(52) U.S. Cl.
CPC ............. *C08F 10/00* (2013.01); *C08F 210/16* (2013.01); *C08F 2410/05* (2013.01)

(58) Field of Classification Search
USPC .......................................................... 526/86
See application file for complete search history.

(56) References Cited

U.S. PATENT DOCUMENTS

| | | |
|---|---|---|
| 7,053,157 B2 | 5/2006 | Sita et al. |
| 7,343,225 B2 | 3/2008 | Hartley et al. |
| 2007/0135591 A1 | 6/2007 | Brown et al. |

FOREIGN PATENT DOCUMENTS

| | | |
|---|---|---|
| EP | 0 798 318 A2 | 10/1997 |
| EP | 0 816 395 A2 | 1/1998 |
| EP | 1 182 216 A2 | 2/2002 |
| EP | 1 810 991 A1 | 7/2007 |
| EP | 2 172 495 A1 | 4/2010 |
| WO | WO 95/26370 A1 | 10/1995 |
| WO | WO 96/02583 A1 | 2/1996 |
| WO | WO 96/39450 A1 | 12/1996 |
| WO | WO 00/05466 A1 | 8/2000 |
| WO | WO 01/67189 A1 | 9/2001 |
| WO | WO 2004/060921 A2 | 7/2004 |
| WO | WO 2005/077522 A1 | 8/2005 |
| WO | WO 2006/069204 A2 | 6/2006 |
| WO | WO 2006/138007 A1 | 12/2006 |
| WO | WO 2008/076386 A1 | 6/2008 |
| WO | WO 2009/079971 A2 | 7/2009 |
| WO | WO 2011/073368 A1 | 6/2011 |

OTHER PUBLICATIONS

Specification of Co-Pending National Phase U.S. Appl. No. 13/695,387, filed Oct. 30, 2012; PCT Int'l Application No. PCT/EP2011/055857, WO 2011/134798 A1, filed Apr. 13, 2011); 21 pgs.
International Search Report, Co-Pending Int'l Application No. PCT/EP2011/055857, (3 pgs), mailed Jun. 29, 2011.
International Application No. PCT/EP2010.070023, Int'l Filing Date Dec. 17, 2010; Certified Priority Document, European Patent Application No. 09179864.5, filed Dec. 18, 2009; 31 pgs.
Notice of Opposition dated Mar. 10, 2015; European Patent Office, EP 2 563 823 B1—Application No. 11715684.4; Title: *Polymerization Process*; Proprietor: Ineos Sales (UK) Limited, Priority Apr. 30, 2010 (EP 10161590), 9 pgs.
Alobaidi, F., et al; "Direct Synthesis of Linear Low-Density Polyethylene of Ethylene/1-Hexene from Ethylene with a Tandem Catalytic System in a Single Reactor"; *Published online in Wiley InterScience* (www.interscience.wiley.com), 10 pgs. (2004).
Sirohi, A., et al; "On-Line Parameter Estimation in a Continuous Polymerization"; *Ind. Eng. Chem. Res.*, 35, pp. 1332-1343 (1996).
McAuley, K.B., et al; "Optimal Grade Transitions in a Gas Phase Polyethylene Reactor"; *AIChE Journal*; vol. 38, No. 10 (1992).
Abstract, Process Economics Program Report 36E, "Linear Low Density Polyethylene"; 4 pgs., (2008).
European Patent Office, Mar. 11, 2015, Opposition against the Patent EP 2 563 823 B1 from the Ineos Sales (UK) Limited 21 pgs.

*Primary Examiner* — Fred M Teskin
(74) *Attorney, Agent, or Firm* — Nixon & Vanderhye P.C.

(57) ABSTRACT

Process for the continuous transition between two different and compatible polymerization catalysts.

16 Claims, No Drawings

POLYMERIZATION PROCESS

This application is the U.S. national phase of International Application No. PCT/EP2011/055856, filed 13 Apr. 2011, which designated the U.S. and claims priority to European Application No. 10161590.4, filed 30 Apr. 2010, the entire contents of each of which are hereby incorporated by reference.

The present invention relates to a process for the continuous transition between two different and compatible polymerisation catalysts.

The present invention also relates to a process for the continuous transition between two different and compatible polymerisation catalysts and between either two ethylene or two propylene polymers.

In particular, the present invention relates to a process for the continuous transition between two different and compatible polymerisation catalysts and between two ethylene copolymers containing a different comonomer.

More particularly, the present invention relates to a process for the continuous transition in a gas phase fluidised bed reactor between two different and compatible polymerisation catalysts and between two ethylene copolymers containing a different comonomer.

BACKGROUND OF THE INVENTION

It is well known that polymerisation conditions can be adjusted to produce a wide variety of products. This is also true for the production of ethylene copolymers. It is not unusual that one reactor system can produce resins useful in injection moulding, blow moulding, rotomoulding applications, wire coating, piping and films. Fluidised bed technology can also be used to make a wide variety of polyolefin products, e.g., homopolymers and copolymers of polyethylene, polypropylene, C4-C12 alpha olefins; ethylene-propylene-diene monomer (EPDM), polybutadiene, polyisoprene, and other rubbers.

However, generally, the polymer products made by a given reactor system use the same reactants but in different ratios and at different temperatures. Each of these polymer products can be made with a number of different resin properties, or grades. Each grade of polymer product has a narrow limit on its properties, e.g., density and melt index. Industrial reactors require time to adjust to the new conditions (e.g., temperature, reactant pressures, and reactant ratios) and produce material in the interim that is constantly changing but not within the properties (e.g., melt index and density) of either the old product or the new one. New products cannot be made instantaneously and require a quantifiable period of transiency in becoming adjusted to the new, desired conditions.

Generally, industrial control systems for gas phase, fluidised bed polymerisation reactors are designed to permit the operators to control the reactor by allowing the operators to select a desired melt index and density. Correlations of these properties are usually well known by the operators and those in the art for the particular reactor design and catalyst used.

The prior art has devised a number of methods to reduce the transient, off grade material. These methods typically involve some combination of adjusting the automatic flow/ratio controllers to a new value either at or above the ultimately desired value ("dial-in transition" and "overshoot"), removing the reactant gas entirely ("inventory blow down"), reducing the level of the catalyst ("low bed"), and adding a nonreactive gas ("nitrogen addition").

DE 4,241,530 describes using a kill gas to stop a polymerization reaction, blowing the gas inventory far that reaction out of the reactor, and rebuilding a new gas inventory for a new product. This method reduces transition material. The cost associated with throwing away the old gas inventory and rebuilding a new inventory is very high for commercial transitions between closely related grades.

The prior art also discloses additional discontinuous transition process, said process usually including a gas phase purge and the addition of catalyst killer compounds.

McAuley et al. ("Optimal. Grade Transitions in a Gas Phase Polyethylene Reactor", AIChE J., Vol. 38, No. 10: 1992, pp. 1564-1576) discloses three manual, labour-intensive transition strategies for gas phase polyethylene reactors. The first is an adjustment to the controls to overshoot the melt index and density values. The hydrogen feed and co-monomer feeds are increased to meet the designated properties. The second is an increase in temperature and manipulation of the slow vent to move the melt index of the produced product. The third is a drop in the catalyst level while keeping the bed resin residence time at a constant value to reduce off grade production.

Debling, et al., "Dynamic Modeling of Product Grade Transitions for Olefin Polymerization Processes", AIChE J., vol. 40, no. 3:1994, pp. 506-520) compares transition performance of different types of polyethylene reactors. The article discloses seven separate manual, labour intensive transition strategies: (1) dialling in the final aim transition; (2) gas inventory blow down and simple dial-in transition; (3) low bed and simple dial-in transition; (4) gas inventory blow down and overshoot of melt index and density transition; (5) low bed, gas inventory blow down, and overshoot transition; (6) low bed and overshoot transition; and (7) gas inventory blow down, overshoot, and nitrogen addition transition.

EP798318 claims a process for controlling a gas phase polymerization reaction in a reactor when changing from a first product made at a first set of conditions to a second product made at a second set of conditions, said process comprising the steps of (a) comparing the first product reaction temperature and the second product reaction temperature, change the product reaction temperature setpoint to the second product reaction temperature if said second product reaction temperature is lower than said first product reaction temperature, (b) setting a melt index setpoint that is either 0-150% higher or 0-70% lower than the desired second product melt index value, (c) setting a reaction temperature setpoint that is: 1-15 DEG C. above the desired second product reaction temperature if the second product melt index value is higher than the first product melt index value, or 1-15 DEG C. below the actual second product reaction temperature if the second product melt index is lower than the first product melt index, (d) setting a product rate-limiting reactant partial pressure setpoint that is: 1-25 psig either below the first product rate-limiting reactant partial pressure if the second product melt index value is higher than the first product melt index value, or above the first product rate-limiting reactant partial pressure if the second product melt index value is lower than the first product melt index value;

(e) maintaining said melt index setpoint, temperature setpoint, and rate-limiting reactant partial pressure setpoint values until said polymerization product exhibits an average melt index and average product density with an acceptable range from the desired second product melt index value and second product density value;
(f) changing said melt index setpoint to the desired second product melt index value;
(g) changing said product reaction temperature setpoint to a value that is: (i) 0-15 DEG C. above said desired second product reaction temperature if the second product melt index value is higher than the first product melt index value, or (ii) 0-15 DEG C. below said desired second product reaction temperature if the second product melt index value is lower than the first product melt index value;
(h) changing said rate-limiting partial pressure setpoint to a value that is: (i) 0-25 psig either below the desired second product rate-limiting partial pressure if the second melt index value is higher than the first melt index value, or (ii) 0-25 psig above the second product rate-limiting partial pressure if the second melt index value is lower than the first melt index value; and
(i) changing the reaction temperature setpoint and the rate-limiting reactant partial pressure setpoint values to the desired second product reaction temperature and second rate-limiting reactant partial pressure value when the reaction product exhibits an average melt index value within acceptable limits of the second product melt index value.

EP798318 depicts in its FIGS. 3-5 a flowchart of the process control. The initial steps are similar to FIGS. 1-2 (which depict the EP798318) prior art methods, i.e. a transition including the lowering of the bed level.

All the examples of EP798318 relate to transitions between ethylene copolymers having the same comonomer, i.e. hexene.

EP1578808 relates to processes for transitioning among polymerization catalyst systems, preferably catalyst systems, which are incompatible with each other. In particular, it relates to processes for transitioning among olefin polymerization reactions utilizing Ziegler-Natta catalyst systems, metallocene catalyst systems and chromium-based catalyst systems.

Again, this prior art includes inter alia the step of lowering the reactor bed during the transition; and the examples relate to transitions between ethylene copolymers having the same comonomer, i.e. hexene.

DESCRIPTION OF THE INVENTION

Despite this wide variety of available schemes, the Applicants could not find in the prior art a satisfactory process for the transition between two different and compatible polymerisation catalysts; and also between two ethylene copolymers containing a different comonomer. Indeed, with the increasing need for high performance products especially adapted to highly specialised applications, it becomes critical to improve the transitioning between catalysts belonging to the same catalyst families. It is therefore an object of the present invention to provide such process allowing to reduce the amount of off grade material produced during the transition, e.g. to provide a better control over potential hot spots and/or static in the reactor and thus reducing and/or eliminating the formation of agglomerates, lumps and/or sheets. Additional benefits provided by the present invention will be depicted in the description and example hereafter.

The present invention provides a process for the transition T1 between an ethylene or a propylene polymerization process carried out in a polymerization reactor in the presence of a catalyst a1, ethylene E or propylene P and optionally an olefin co-monomer A1 to produce an ethylene polymer or a propylene polymer P1 into an ethylene or a propylene polymerization process carried out in the same polymerization reactor in the presence of a catalyst a2, ethylene E or propylene P and optionally an olefin co-monomer A2 to produce an ethylene polymer or a propylene polymer P2 characterised in that catalyst a1 and a2 are different and compatible;
catalyst a1 and catalyst a2 are both active and present in the reactor during at least part of the transition T1 from P1 to P2; and
the transition T1 is performed continuously.

For the purpose of the present description and appended claims, the transition T1 is defined as the period between the steady state production of the polymer P1 and the steady state production of the polymer P2.

According to the present invention, the transition T1 is operated between compatible catalysts. The term "compatible catalysts", as used herein, includes two or more catalysts having similar kinetics of termination and insertion of monomer and comonomer(s) and/or that do not detrimentally interact with each other. The term "compatible catalysts", as used herein, includes those that satisfy one or more of the following (preferably all of the following):

1) those catalysts that in each others presence reduce the activity of at least one of the catalysts by less than 50%, preferably less than 75%, more preferably less than 90%;
2) those catalysts such that under the same reactive conditions one of the catalysts does not produce polymers having a weight average molecular weight more than two times higher than any other catalyst in the system; and
3) those catalysts that differ in comonomer incorporation or reactivity ratio under the same conditions by less than about 30%. The terms "catalysts" and "catalyst systems" are used interchangeably herein.

The weight average molecular weight can advantageously be measured by GPC ("Gel Permeation Chromatography"). One can advantageously use a Waters 150CV, with 4 Waters HMW 6E columns and a differential refractometer detector. The solvent used is 1,2,4 Trichlorobenzene at 135° C., which is stabilised with BHT, of 0.2 g/liter concentration and filtered with a 0.45 µm Osmonics Inc. silver filter. Polymer solutions of 1.0 g/liter concentration are prepared at 160° C. for one hour with stirring only at the last 30 minutes. The nominal injection volume is set at 400 µl and the nominal flow rate is 1 ml/min. A relative calibration is constructed using 13 narrow molecular weight linear polystyrene standards:

| PS Standard | Molecular Weight |
| --- | --- |
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, is recorded for each PS standards. The PS molecular weight is then converted to PE equivalent using the following Mark Houwink parameters kps=1.21× 10-4, αps=0.707, kpe=3.92×10-4, αpe=0.725. The calibration curve $Mw_{PE}=f(V)$ is then fitted with a first order linear equation. All the calculations are done with Millennium 3.2 software from Waters.

According to the present invention, the transition T1 is operated between different catalysts. The term "different catalysts", as used herein, means that these catalysts differ from each other in at least one characteristic of their respective preparation method. For example, said difference may be
- the use of a different chemical compound in the catalyst synthesis, and/or
- the use of a different reactant content in the respective catalyst system (e.g. the content of the reactant R in the catalyst a1 being at least 15% higher or 15% lower than its content in the catalyst a2.

For the avoidance of doubt, the present invention does not cover the transition T1 between identical catalysts (system); e.g. the present invention does cover the transition between different batches of identical catalysts (systems).

For the avoidance of doubt, the present invention does not cover the transition T1 between a metallocene catalyst (system) and a chromium catalyst (system), and vice et versa; the present invention does not cover either the transition T1 between a metallocene catalyst (system) and a Ziegler-Natty catalyst (system), and vice et versa; the present invention does not cover either the transition T1 between a Ziegler-Natta catalyst (system) and a chromium catalyst (system), and vice et versa The transition T1 according to the present invention is performed continuously. For the purpose of the present invention and appended claims, a continuous transition must fulfil at least one of the following conditions:

1. the polymerisation production rate ("R"), defined as the amount of polymer produced by unit of time (e.g. tons/hour), must fulfil the following equation $$0.55 \times R_{P1} < R_{T1} < 1.45 \times R_{P1}$$

wherein $R_{P1}$ is the steady state production rate of the polymer P1 just before the start of the transition, and $R_{T1}$ is the production rate of the polymer during the transition T1;
a preferred polymerisation production rate of the present invention must fulfil the following equation $$0.80 \times R_{P1} < R_{T1} < 1.20 \times R_{P1}$$

2. no deinventorying of the reaction system contents is operated during the transition T1. For the man skilled in the art, deinventorying means significantly purging the reactor, e.g. by removing at least 50% by weight of the gases (e.g. monomer) and/or at least 50% by weight of the solids (e.g. the polymer) and/or at least 50% by weight of the liquids (e.g. monomer and/or comonomer and/or alkane) present in the reaction loop. For example, for gas phase polymerisation reactors, the main monomer (ethylene or propylene) partial pressure (pMM) must fulfil the following equation $$0.55 \times pMM_{P1} < pMM_{T1} < 1.45 \times pMM_{P1}$$

wherein $pMM_{P1}$ is the main monomer partial pressure just before the start of the transition T1, and $pMM_{T1}$ is the main monomer partial pressure during the transition T1;
a preferred main monomer partial pressure of the present invention must fulfil the following equation $$0.80 \times pMM_{P1} < pMM_{T1} < 1.20 \times pMM_{P1}$$

For example, for slurry polymerisation reactors, the main monomer (ethylene or propylene) feed rate (qMM) must fulfil the following equation $$0.55 \times qMM_{P1} < qMM_{T1} < 1.45 \times qMM_{P1}$$

wherein $qMM_{P1}$ is the main monomer feed rate just before the start of the transition T1, and $qMM_{T1}$ is the main monomer feed rate during the transition T1;
a preferred main monomer feed rate of the present invention must fulfil the following equation $$0.80 \times qMM_{P1} < qMM_{T1} < 1.20 \times qMM_{P1}.$$

3. the transition T1 is preferably operated in the absence of injection in the reactor of a catalyst killer (also identified as polymerisation inhibitor and/or poison). Whilst not preferred, the addition of a catalyst killer during the transition is tolerated only if it does not reduce by more then 40%, preferably more than 20%, the activity of the catalyst system a1 and the activity of the catalyst system a2. The catalyst killer is a compound or mixture of compounds that is capable of deactivating the catalyst system. For the purposes of the present application, the term "catalyst killer" does not include the minor portion of similar compounds that may be present in the monomer or comonomer feed streams during normal polymerisation conditions, such as internal olefins or hydrogen, for example. An exemplary catalyst killer includes one or more compounds selected from the group consisting of water, oxygen, alcohols, glycols, phenols, ethers, carbonyl compounds such as ketones, aldehydes, carboxylic acids, esters, fatty acids, alkynes such as acetylene, amines, nitrites, nitrous compounds, pyridine, pyroles, carbonylsulfide (COS), mercaptans, derivatives thereof, or any mixtures or combinations thereof.

4. the polymerisation catalyst activity, defined as the amount of polymer produced by unit of time and by amount of catalyst (e.g. g/hour/g cata), must fulfil the following equations $$0.55 \times A_{P1} < A_{T1} < 1.45 \times A_{P1} \quad \text{a.}$$

$$0.55 \times A_{P2} < A_{T1} < 1.45 \times A_{P2} \quad \text{b.}$$

wherein $A_{P1}$ is the activity of the catalyst system a1 used for the production of the polymer P1 just before the start of the transition T1 (i.e. in steady state operations), $A_{P2}$ is the activity of the catalyst system a2 used for the production of the polymer P2 just after the end of the transition T1 (i.e. in steady state operations) and $A_{T1}$ is the catalyst activity of the catalyst system used during the transition;
a preferred polymerisation catalyst activity of the present invention must fulfil the following equations $$0.80 \times A_{P1} < A_{T1} < 1.20 \times A_{P1} \quad \text{a.}$$

$$0.80 \times A_{P2} < A_{T1} < 1.20 \times A_{P2} \quad \text{b.}$$

For the purpose of the present description and appended claims, it will be apparent for the man skilled in the art that
$R_{T1}$ the production rate during the transition T1,
$pMM_{T1}$ the main monomer partial pressure during the transition T1, and/or
$qMM_{T1}$ the main monomer feed rate during the transition T1, and
$A_{T1}$ the catalyst activity of the catalyst system during the transition T1 may vary during the transition T1. The above conditions define boundaries between which said parameters may preferably vary.

According to the most preferred embodiment of the present invention, condition 1 (polymerisation production rate) must be fulfilled; according to another preferred embodiment of the present invention, a continuous transition must fulfil at least two, preferably three, most preferably all of the above recited conditions.

According to a preferred embodiment of the present invention, the continuous transition T1 may also advantageously include an additional polymerisation control step which takes place at the beginning of the transition T1 and which takes into account the intrinsic behaviour of the respective polymerisation catalyst a1 and a2. Said polymerisation control step includes at least one action which can be chosen amongst a decrease/increase of the main monomer partial pressure, a decrease/increase of the main monomer feed rate, a decrease/increase of the ratio of comonomer to main monomer, a decrease/increase of the rate of introduction of the co-catalyst, a decrease/increase of the rate of introduction of a catalyst activity improver (e.g. an halogenated component like an alkyl chloride and/or chloroform), a decrease/increase of the partial pressure of hydrogen. For example, when the transition takes place between a Ziegler-Natta catalyst ZNa1 and a Ziegler-Natta catalyst ZNa2 which exhibits a higher activity compared to ZNa1, the control step will advantageously be the decrease of the partial pressure of ethylene preferably before the introduction of the catalyst ZNa2.

According to an additional preferred embodiment of the present invention, the continuous transition T1 may also advantageously include an additional polymerisation control step which takes place towards the end of the transition T1 and which takes into account the intrinsic behaviour of the respective polymerisation catalyst a1 and a2. Said polymerisation control step includes at least one action which can be chosen amongst a decrease/increase of the main monomer partial pressure, a decrease/increase of the main monomer feed rate, a decrease/increase of the ratio of comonomer to main monomer, a decrease/increase of the rate of introduction of the co-catalyst, a decrease/increase of the rate of introduction of a catalyst activity improver (e.g. an halogenated component like an alkyl chloride and/or chloroform), a decrease/increase of the partial pressure of hydrogen. For example, when the transition takes place between a Ziegler-Natta catalyst ZNa1 and a Ziegler-Natta catalyst ZNa2 wherein ZNa1 exhibits a higher activity compared to ZNa2, the control step will advantageously be the increase of the partial pressure of ethylene preferably after having stopped the introduction of the catalyst ZNa1; said increase of the partial pressure of ethylene may also advantageously take place after the rate of introduction of the catalyst ZNa2 has reached its final steady state.

The man skilled in the art knows how to control the polymer production rate in a continuous polymerisation process, e.g. by varying the monomer feed rate and/or the comonomer feed rate and/or the catalyst injection rate, etc. . . .

The man skilled in the art also knows how to control the activity of a catalyst, e.g. by varying process conditions like e.g. the catalyst residence time and/or the partial pressure of ethylene and/or the partial pressure of the comonomer and/or the partial pressure of hydrogen, etc. . . .

One of the many advantages of the present invention over the prior art relates directly to the respect of the environment. Indeed, whilst the prior art operates transitions with substantial hydrocarbon release (e.g. gas reactor inventory renewal), i.e. with important pollution of the atmosphere, the applicants have managed to develop a technology which reduces considerably—or even eliminates—the said releases.

Catalyst system a1 and catalyst system a2 are thus both active and present in the reactor during at least part of the transition T1 from P1 to P2; preferably, such simultaneous presence of both catalyst systems lasts for at least 50% of the duration of the transition.

According to an embodiment of the present invention, the transition from P1 to P2 comprises a period during which both fresh catalyst a1 and fresh catalyst a2 are fed simultaneously in the reactor.

According to an embodiment of the present invention, co-monomer A1 and co-monomer A2 are the same co-monomer.

According to another embodiment, co-monomer A1 and co-monomer A2 are different co-monomer, as detailed hereafter: thus, the present invention also provides a process for the transition T between an ethylene co-polymerization process carried out in a polymerization reactor in the presence of a catalyst a1, ethylene E and an olefin co-monomer A to produce an ethylene copolymer P1 in an ethylene co-polymerization process carried out in the same polymerization reactor in the presence of a catalyst a2, ethylene E and an olefin co-monomer B to produce an ethylene copolymer P3 characterised in that catalyst a1 and a2 are different and compatible;
co-monomer A and co-monomer B are different; and
the transition T is performed continuously and comprises
two distinct and consecutive transitions T1 and T2 wherein
the first transition corresponds to the hereinabove defined transition T1 from P1 to P2, and
the first transition T1 is followed by a second transition T2 between an ethylene co-polymerization process carried out in the same polymerization reactor in the presence of catalyst a2, ethylene E and an olefin co-monomer A to produce an ethylene copolymer P2 in an ethylene co-polymerization process carried out in the same polymerization reactor in the presence of the same catalyst a2, ethylene E and an olefin co-monomer B to produce an ethylene copolymer P3 characterised in that
co-monomer A and co-monomer B are both present in the reactor during at least part of the transition T2 from P2 to P3, and
the transition T2 is performed continuously from P2 to P3.

For the purpose of the present description and appended claims, the transition T2 is defined as the period between the steady state production of the copolymer P2 and the steady state production of the copolymer P3. For the purpose of the present description and appended claims, the transition T is defined as the period between the steady state production of the copolymer P1 and the steady state production of the copolymer P3.

The respective steady state productions of P1, P2 and P3 exclusively relates to copolymers. Whilst some terpolymer TEAB is inherently produced during the transition T2, the present invention does not cover the transition between terpolymers.

The transition T2 according to the present invention is performed continuously. For the purpose of the present invention and appended claims, a continuous transition T2 must fulfil at least one of the following conditions:

1. the polymerisation production rate ("R"), defined as the amount of polymer produced by unit of time (e.g. tons/hour), must fulfil the following equation $$0.55 \times R_{P2} < R_{T2} < 1.45 \times R_{P2}$$

wherein $R_{P2}$ is the steady state production rate of the copolymer P2 just before the start of the transition T2, and $R_{T2}$ is the production rate of the polymer during the transition T2;
a preferred polymerisation production rate of the present invention must fulfil the following equation $$0.80 \times R_{P2} < R_{T2} < 1.20 \times R_{P2}$$

2. no deinventorying of the reaction system contents is operated during the transition T2. For the man skilled in the art, deinventorying means significantly purging the reactor, e.g. by removing at least 50% by weight of the gases (e.g. monomer) and/or at least 50% by weight of the solids (e.g. the polymer) and/or at least 50% by weight of the liquids (e.g. monomer and/or comonomer and/or alkane) present in the reaction loop. For example, for gas phase polymerisation reactors, the ethylene partial pressure ($pC_2^=$) must fulfil the following equation $$0.55 \times pC_2^={}_{P2} < pC_2^={}_{T2} < 1.45 \times pC_2^={}_{P2}$$

wherein $pC_2^={}_{P2}$ is the ethylene partial pressure just before the start of the transition T2, and $pC_2^={}_{T2}$ is the ethylene partial pressure during the transition T2;
a preferred ethylene partial pressure of the present invention must fulfil the following equation $$0.80 \times pC_2^={}_{P2} < pC_2^={}_{T2} < 1.20 \times pC_2^={}_{P2}.$$

For example, for slurry polymerisation reactors, the main monomer (ethylene or propylene) feed rate (qMM) must fulfil the following equation $$0.55 \times qMM_{P1} < qMM_{T1} < 1.45 \times qMM_{P1}$$

wherein $qMM_{P1}$ is the main monomer feed rate just before the start of the transition T1, and $qMM_{T1}$ is the main monomer feed rate during the transition T1;
a preferred main monomer feed rate of the present invention must fulfil the following equation $$0.80 \times qMM_{P1} < qMM_{T1} < 1.20 \times qMM_{P1}.$$

3. the transition T2 is preferably operated in the absence of injection of a catalyst killer in the reactor (also identified as polymerisation inhibitor and/or poison). Whilst not preferred, the addition of a catalyst killer during the transition T2 is tolerated only if it does not reduce by more then 40%, preferably more than 20%, the activity of the catalyst. The catalyst killer is a compound or mixture of compounds that is capable of deactivating the catalyst system. For the purposes of the present application, the term "catalyst killer" does not include the minor portion of similar compounds that may be present in the monomer or comonomer feed streams during normal polymerisation conditions, such as internal olefins or hydrogen, for example. An exemplary catalyst killer includes one or more compounds selected from the group consisting of water, oxygen, alcohols, glycols, phenols, ethers, carbonyl compounds such as ketones, aldehydes, carboxylic acids, esters, fatty acids, alkynes such as acetylene, amines, nitrites, nitrous compounds, pyridine, pyroles, carbonylsulfide (COS), mercaptans, derivatives thereof, or any mixtures or combinations thereof.
4. the polymerisation catalyst activity, defined as the amount of polymer produced by unit of time and by amount of catalyst (e.g. g/hour/g cata), must fulfil the following equation $$0.55 \times A_{P2} < A_{T2} < 1.45 \times A_{P2}$$

wherein $A_{P2}$ is the activity of the catalyst system a2 used for the production of the copolymer P2 just before the start of the transition T2 (i.e. in steady state operations), and $A_{T2}$ is the catalyst activity of the catalyst system a2 used during the transition T2;
a preferred polymerisation catalyst activity of the present invention must fulfil the following equation $$0.80 \times A_{P2} < A_{T2} < 1.20 \times A_{P2}$$

Again, for the purpose of the present description and appended claims, it will be apparent for the man skilled in the art that
$R_{T2}$ the production rate during the transition T2,
$pC_2^={}_{T2}$ the ethylene partial pressure during the transition T2, and/or
$qMM_{T1}$ the main monomer feed rate during the transition T1, and
$A_{T2}$ the catalyst activity of the catalyst system during the transition T2 may vary during the transition. The above conditions define boundaries between which said parameters may preferably vary.

According to the most preferred embodiment of the present invention, condition 1 (polymerisation production rate) must be fulfilled; according to another preferred embodiment of the present invention, a continuous transition T2 must fulfil at least two, preferably three, most preferably all of the above recited conditions.

The man skilled in the art knows how to control the polymer production rate in a continuous polymerisation process, e.g. by varying the monomer feed rate and/or the comonomer feed rate and/or the catalyst injection rate, etc. . . .

The man skilled in the art also knows how to control the activity of a catalyst, e.g. by varying process conditions like e.g. the catalyst residence time and/or the partial pressure of ethylene and/or the partial pressure of the comonomer and/or the partial pressure of hydrogen, etc. . . .

One of the many advantages of the present invention over the prior art relates directly to the respect of the environment. Indeed, whilst the prior art operates transitions with substantial hydrocarbon release (e.g. gas reactor inventory renewal), i.e. with important pollution of the atmosphere, the applicants have managed to develop a technology which reduces considerably—or even eliminates—the said releases.

According to this embodiment of the present invention, co-monomer A and co-monomer B are both present in the reactor during at least part of the transition T2 from P2 to P3; preferably, such simultaneous presence of both co-monomer A and co-monomer B lasts for at least 50% of the duration of the transition T2. According to a preferred embodiment of the present invention, the transition from P2 to P3 comprises a period during which both fresh co-monomer A and fresh co-monomer B are fed simultaneously in the reactor.

According to a preferred embodiment of the present invention, the transition T1 is operated between different catalysts belonging to the same catalyst family. For example, if a chromium catalyst a1 is used as the catalyst for producing P1, the catalyst a2 for producing P2 and optionally P3 will also be a chromium catalyst; e.g. said chromium catalysts have at least one chemical constituent which is different when comparing composition a1 and composition a2. For example, if a Ziegler-Natta catalyst is used as the catalyst for producing P1, the catalyst for producing P2 and optionally P3 will also be a Ziegler-Natta catalyst; e.g. said Ziegler-Natta catalysts have at least one chemical constituent which is different when comparing composition a1 and composition a2. For example, if a metallocene catalyst is used as the catalyst for producing P1, the catalyst for producing P2 and optionally P3 will also be a metallocene catalyst; e.g. said metallocene catalysts have at least one chemical constituent which is different when comparing composition a1 and composition a2.

According to the present invention, the same catalyst is used for the production of both the copolymer P2 and the copolymer P3.

According to a preferred embodiment of the present invention, the melt index (MI) of the polymer P1 and polymer P2 fulfil the following equation $$0.55 \times MI(P1) < MI(P2) < 1.45 \times MI(P1)$$

preferably $$0.9 \times MI(P1) < MI(P2) < 1.1 \times MI(P1)$$

more preferably $$0.95 \times MI(P1) < MI(P2) < 1.05 \times MI(P1)$$

wherein the melt index is preferably measured using the standard ISO 1133 at a temperature of 190° C. under load of 5 Kg.

According to an additional preferred embodiment of the present invention, the melt index (MI) of the copolymer P2 and copolymer P3 fulfil the following equation $$0.55 \times MI(P2) < MI(P3) < 1.45 \times MI(P2)$$

preferably $$0.9 \times MI(P2) < MI(P3) < 1.1 \times MI(P2)$$

more preferably $$0.95 \times MI(P2) < MI(P3) < 1.05 \times MI(P2)$$

wherein the melt index is preferably measured using the standard ISO 1133 at a temperature of 190° C. under load of 5 Kg.

According to a preferred embodiment of the present invention, the density (d) of the polymer P1 and polymer P2 fulfil the following equation $$[d(P1)-0.010] < d(P2) < [d(P1)+0.010]$$

preferably $$[d(P1)-0.005] < d(P2) < [d(P1)+0.005]$$

more preferably $$[d(P1)-0.001] < d(P2) < [d(P1)+0.001]$$

wherein the density is given in Kg/m3 and is preferably measured according to the standard ISO 1183-1 (Method A).

According to an additional preferred embodiment of the present invention, the density (d) of the copolymer P2 and copolymer P3 fulfil the following equation $$[d(P2)-0.010] < d(P3) < [d(P2)+0.010]$$

preferably $$[d(P2)-0.005] < d(P3) < [d(P2)+0.005]$$

more preferably $$[d(P2)-0.001] < d(P3) < [d(P2)+0.001]$$

wherein the density is given in Kg/m3 and is preferably measured according to the standard ISO 1183-1 (Method A).

According to an additional preferred embodiment of the present invention, there is no substantial change of the reactor solids inventory during the transitions T, T1 and T2. For example, this may be translated by the fact that the mass of polymer present in the reactor during the transition (T1 and T2) is at least 75% of the mass of polymer just before the start of the transition (i.e during steady production of the polymer), preferably at least 80%, more preferably at least 90%, most preferably at least 95%. For example, for a gas phase fluidised bed reactor, this may be translated by the fact that the reactor bed height during the transition (T1 and T2) is at least 75% of the reactor bed height just before the start of the transition (i.e during steady production of the polymer), preferably at least 80%, more preferably at least 90%, most preferably at least 95%. The man skilled in the art knows how to measure bed heights, e.g by using nucleonic devices or pressure differential measurements. For the purpose of the present invention and appended claims, the bed height is measured by using the pressure measurement method as described in the Perry's Chemical Engineers' Handbook, Seventh Edition, International Edition 1998, page 17-13.

The transitioning process of the present invention is thus applied to a continuous polymerisation reaction process. Said polymerisation reaction can take place in any appropriate reactor, e.g. a gas phase reactor, a gas/liquid phase reactor or a slurry reactor.

When the olefin polymerisation reaction is in slurry phase, the reactor is preferably a slurry loop reactor. Slurry phase polymerisation of olefins is well known wherein an olefin monomer and an olefin comonomer are polymerised in the presence of a catalyst in a diluent in which the solid polymer product is suspended and transported. Liquid full loop reactors are particularly well known in the art and are described for example in U.S. Pat. Nos. 3,152,872, 3,242, 150 and 4,613,484.

Polymerisation is typically carried out at temperatures in the range 50-125 degrees C. and at pressures in the range 1-100 bara. The catalyst used can be any catalyst typically used for olefin polymerisation such as chromium oxide, Ziegler-Natta or metallocene-type catalysts. The product slurry comprising polymer and diluent, and in most cases catalyst, olefin monomer and comonomer can be discharged intermittently or continuously, optionally using concentrating devices such as hydrocyclones or settling legs to minimise the quantity of fluids withdrawn with the polymer.

The loop reactor is of a continuous tubular construction comprising at least two, for example four, vertical sections and at least two, for example four, horizontal sections. The heat of polymerisation is typically removed using indirect exchange with a cooling medium, preferably water, in jackets surrounding at least part of the tubular loop reactor. The volume of the loop reactor can vary but is typically in the range 20 to 120 cubic meters.

When polymerisation reaction is in the gas phase, the method may be carried out in a stirred and/or gas fluidised bed. Gas phase polymerisation of a mixture of polymerisable olefin to produce normally solid polymer substances using a quench-cooled, gas-phase polymerisation reactor containing a sub-fluidised particulate bed of polymerised olefin has been described in a number of patents including: U.S. Pat. No. 3,957,448, U.S. Pat. No. 3,965,083 and U.S. Pat. No. 3,971,768. These U.S. Patents describe polymerisation processes and apparatus in which polymer is formed from gaseous olefin in horizontal stirred-bed vessels.

According to the most preferred embodiment of the present invention, the method of the present invention is carried out continuously in the gas phase in a fluidised-bed reactor. Such processes are well-known, and examples include EP 0 475 603, EP 1 240 217, EP 1 484 344 and EP 0 855 411.

In such processes, the particles of polymer being formed are maintained in the fluidised state by virtue of a reaction gas mixture containing the monomer(s) to be polymerised travelling in a rising stream. The polymer thus manufactured in powder form is generally drained from the reactor in order to keep the bed of fluidised polymer particles at a more or less constant volume. The process generally employs a fluidisation grid which distributes the reaction gas mixture through the bed of polymer particles and which acts as a support for the bed in the event of a cut in the flow of the rising gas. The reaction gas mixture leaving at the top of the fluidised-bed reactor is recycled to the base of the latter under the fluidisation grid by means of an external circulation conduit.

The polymerisation of the olefins is an exothermic reaction. The reaction mixture comprising the olefins to be polymerised is generally cooled by means of at least one heat exchanger arranged on the outside of the reactor before being recycled.

Liquid, especially but not limited to liquid condensed from the cooled reaction mixture during recycle, may be injected in the reaction zone. Vaporisation of the liquid in the reaction zone provides the effect of cooling directly in the reaction zone.

The method of the invention is particularly suitable for very large industrial reactors; in accordance with one embodiment of the present invention, the reactor used makes it possible to produce quantities of polymer of more than 3000 kg/h, preferably more than 10,000 kg/h. The process of the invention is further particularly suitable for high space time yields (in terms of weight of polymer produced per unit volume of reactor space per unit time) in commercial gas fluidised bed reactors; consequently, according to a further embodiment of the present invention, space time yields are higher than 25 kg/m$^3$/h, preferably higher than 50 kg/m$^3$/h, more preferably higher than 80 kg/m$^3$/h. The Space Time Yield (STY) expressed in [kg/(m$^3$×h)] is well known and represents the weight of polymer produced per unit of time and per unit of reactor volume. The weight of polymer production per unit of time can also advantageously be calculated as the average steady (co)monomers feed rate (ignoring therefore the slight fluctuations due to (co)monomers losses, e.g. purges).

The principal olefin according to the present invention is ethylene or propylene. Ethylene or propylene represents more than 50% by weight of the polymer produced.

When used, comonomer olefins are preferably selected from alpha-olefins having 2 to 12 carbon atoms. Suitable comonomer olefins are ethylene, propylene, 1-butene, 1-hexene, 4-methyl-1-pentene and 1-octene. Preferably, the principal olefin is ethylene and the comonomer is 1-butene, 1-hexene or 1-oetene. Alternatively, the principal olefin can be propylene and the comonomer ethylene.

The reaction mixture may also comprise one or more inert compounds, especially inert gases such as nitrogen, and/or one or more saturated hydrocarbons such as ethane, propane, butane, pentane and hexane.

The method according to the present invention may be used to prepare a wide variety of polymer products, e.g. polypropylene, linear low density polyethylene (LLDPE), LLDPE especially based on copolymers of ethylene with 1-butene, 1-hexene or 1-octene. This method is particularly suitable for the production of very low density polyethylene (VLDPE). A further suitable polyethylene product is high density polyethylene (HDPE), especially copolymers of ethylene with a small portion of higher alpha olefin, for example, 1-butene, 1-pentene, 1-hexene or 1-octene.

The method is particularly suitable for polymerising olefins in the gas phase at an absolute pressure of between 0.5 and 6 MPa and at a temperature of between 30° C. and 130° C. For example, for LLDPE production the temperature is suitably in the range 75-100° C. and for HDPE the temperature is typically 80-115° C. depending on the activity of the catalyst used and the polymer properties desired.

The total pressure in the gas phase polymerisation reactor is most preferably between 1.5 and 3 MPa.

The method of the present invention may be applied to polymerisation processes using any suitable polymerisation catalyst, including Ziegler-Natta type catalysts chromium oxide type catalysts, and metallocene type catalysts.

The copolymerisation may therefore be carried out, for example, in the presence of a catalyst of Ziegler-Natta type comprising at least one transition metal in combination with a cocatalyst comprising an organometallic compound, for example an organoaluminium compound. The catalyst essentially comprises an atom of a transition metal selected from the metals of groups IV to VI of the periodic classification of the elements, such as titanium, vanadium, chromium, zirconium or hafnium, optionally a magnesium atom and a halogen atom. The catalyst may be supported on a porous refractory oxide such as silica or alumina or may be combined with a solid magnesium compound, such as the chloride, the oxide, the hydroxy chloride or an alcoholate of magnesium. By way of example, mention may be made of the catalysts described in the patents U.S. Pat. No. 4,260,709, EP 0 598 094, EP 0 099 774 and EP 0 175 532. The present invention is also particularly appropriate for silica-supported Ziegler catalysts, for example those described in Patents WO 93/09147, WO 95/13873, WO 95/34380, WO 99/05187 and U.S. Pat. No. 6,140,264. The catalyst can be used as it is or optionally in the form of a coated catalyst or prepolymer containing, for example, from $10^{-5}$ to 3, preferably from $10^{-3}$ to $10^{-1}$, millimoles of transition metal per gram of polymer; it can be used together with a cocatalyst or activator, e.g. an organometallic compound of a metal from groups I to III of the Periodic Classification of the Elements, such as, for example, an organoaluminium compound. It is also possible to use a catalyst complexed by a metal selected from those of group VIII of the periodic classification of the elements, such as, for example, nickel, iron or cobalt. By way of examples, mention may be made of those described in Patent Application WO 98/27124 or WO 98/2638. It is also possible to use catalysts based on platinum or palladium as the transition metal; complexes of this type are described, for example, in the Patent WO 96/23010.

The copolymerisation may thus also be carried out in the presence of a chromium oxide catalyst. Examples of chromium oxide catalysts are typically those comprising a refractory oxide support which is activated by a heat treatment advantageously carried out at a temperature of at least 250° C. and at most equal to the temperature at which the granular support begins to sinter and under a non-reducing atmosphere and preferably an oxidising atmosphere. This catalyst can be obtained by a great number of known process, in particular by those according to which, in a first stage, a chromium compound, such as a chromium oxide, generally of formula CrO3, or a chromium compound which can be converted by calcination into chromium oxide, such as, for example, a chromium nitrate or sulphate, an ammonium chromate, a chromium carbonate, acetate or acetylacetonate, or a tert-butyl chromate, is combined with a granular support based on refractory oxide, such as, for example, silica, alumina, zirconium oxide, titanium oxide or a mixture of these oxides or aluminium or boron phosphates or mixtures in any proportion of these phosphates with the above mentioned oxides. In a second stage, the chromium compound thus combined with the granular support is subjected to a so-called activation operation by heat treatment in a non-reducing atmosphere and preferably an oxidising atmosphere at a temperature of at least 250° C. and at most that at which the granular support begins to sinter. The temperature of the heat treatment is generally between 250° C. and 1200° C. and preferably between 350 and 1000° C. Such catalyst preferably contains from 0.05 to 5%, more preferably from 0.1 to 2%, by weight of chromium; it can contain, in addition to the chromium, from 0.1 to 10% of titanium in the form of titanium oxide and/or fluorine and/or aluminium, in particular in the form of aluminium oxide; it can be used as it is or optionally in the form of a coated catalyst or prepolymer containing, for example, from $10^{-5}$ to 3, preferably from $10^{-3}$ to $10^{-1}$, millimoles of chromium per gram of polymer. The chromium oxide catalysts may be used together with a cocatalyst or activator, e.g. an organometallic compound of a metal from groups I to III of the Periodic Classification of the Elements, such as, for example, an organoaluminium compound. Examples of catalysts can be found, for example, in EP 0 275 675, EP 0 453 116, or WO 99/12978.

The method of the present invention is also preferably applied to a polymerisation process in which the catalyst is a metallocene-type catalyst.

With regards to particular metallocene-type catalysts, mention may be made, by way of example, of those corresponding to the formula

[L]mM[A]n where L is a bulky ligand; A is a leaving group, M is a transition metal and m and n are such that the total valency of the ligand corresponds to the valency of the transition metal.

The ligands L and A may be bridged. L is generally a ligand of the cyclopentadienyl type.

Examples of metallocene catalysts of this type are described in U.S. Pat. Nos. 4,530,914, 5,124,418, 4,808,561, 4,897,455, 5,278,264, 5,278,119, 5,304,614, and EP 0 129 368, EP 0 591 756, EP 0 520 732, EP 0 420 436, WO 91/04257, WO 92/00333, WO 93/08221, WO 93/08199.

It is also possible to use with advantage the metallocene-based catalyst systems as described in U.S. Pat. Nos. 4,871,705, 4,937,299, 5,324,800, 5,017,714, 5,120,867, 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP 0 561 476, EP 0 279 586, EP 0 594 218, WO 94/10180 and WO 2006/085051.

Mention may also be made of the Patents WO 92/00333, WO 94/07928, WO 91/04257, WO 94/03506, U.S. Pat. Nos. 5,057,475, 5,096,867, 5,055,438, 5,198,401, 5,227,440, 5,264,405, EP-A-0 420 436, U.S. Pat. Nos. 5,604,802, 5,149,819, 5,243,001, 5,239,022, 5,276,208, 5,296,434, 5,321,106, 5,329,031, 5,304,614, WO 93/08221, WO 93/08199 and EP 0 578 838. The preferred transition metal compounds of the catalyst are those of group 4, in particular zirconium, titanium and hafnium.

The metallocene catalyst may also be represented by the general formula (Cp)m MRnR'p, where Cp is a ring of the cyclopentadienyl type, M is a transition metal of group 4, 5 or 6; R and R' may be selected from halogens and hydrocarbyl or hydrocarboxyl groups; m=1-3, n=0-3, p=0-3 and the sum m+n+p equals the oxidation state of M; preferably, m=2, n=1 and p=1.

The metallocene catalyst may be also represented by the general formula (C5 R'm)p R''s(C5 R'm)Me Q3−p−x, or R''s(C5 R'm)2MeQ' where Me is a transition metal of group 4, 5 or 6, at least one C5 R'm is a substituted cyclopentadienyl, each R', which may be identical or different, is hydrogen, an alkyl, alkenyl, aryl, alkylaryl or arylalkyl radical having 1 to 20 carbon atoms, or two carbon atoms linked together to form part of a substituted or unsubstituted ring having 4 to 20 carbon atoms, R" is a radical containing one or more or a combination of carbon, germanium, silicon, phosphorus or nitrogen atoms which bridges two rings (C5 R'm), or which bridges one ring (C5 R'm) to M, when p=0, x=1, else "x" is always 0, each Q, which may be identical or different, is an alkyl, alkenyl, aryl, alkylaryl or arylalkyl radical having 1 to 20 carbon atoms, a halogen or an alkoxide, Q' is an alkylidene radical having 1 to 20 carbon atoms, s is 0 or 1, and when s is 0, m is 5 and p is 0, 1 or 2 and when s is 1, in is 4 and p is 1.

The metallocene catalysts are generally used with an activator or cocatalyst. Examples which may be mentioned include alumoxane and/or ionic or neutral ionising activators, or compounds such as pentafluorophenyl tri(n-butyl) ammonium tetraborate or the boric metalloid precursor of trisperfluorophenyl, which ionises the neutral metallocene compound. Compounds of this type are described in EP 0 570 982, EP 0 520 732, EP 0 495 375, EP 0 426 637, EP 0 500 944, EP 0 277 003, EP 0 277 004, U.S. Pat. Nos. 5,153,157, 5,198,401, 5,066,741, 5,206,197 and 5,241,025, and WO 94/07928.

Catalyst combinations may also be used, for example those described in U.S. Pat. Nos. 5,281,679, 4,701,432, 5,124,418, 5,077,255 and 5,183,867.

Other examples of metallocene catalysts are described in Patents EP 0 593 083, U.S. Pat. Nos. 5,317,036, 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706, WO 95/10542, WO 95/07939, WO 94/26793 and WO 95/12622.

Preferably, the metallocene comprises
A) an inert support,
B) a group 4-10 metal complex corresponding to the formula:

where M is a metal of one of groups 4 to 10 of the Periodic Table of the Elements, Cp is an anionic ligand group,
Z is a divalent moiety linked to Cp and linked to M, comprising boron or an element of group 14 of the Periodic Table of the Elements, and further comprising nitrogen, phosphorus, sulphur or oxygen;
X is a neutral conjugated diene ligand group having up to 60 atoms, or a dianionic derivative, and C) an ionic cocatalyst capable of converting the metal complex into an active polymerisation catalyst.

Examples of cocatalysts are described in U.S. Pat. Nos. 5,132,380, 5,153,157, 5,064,802, 5,321,106, 5,721,185 and 5,350,723. Mention may also be made of the complexes described in WO 96/28480 and WO 98/27119.

The catalyst may be used in the form of a prepolymer prepared beforehand during a prepolymerisation step from catalysts described above. The prepolymerisation may be carried out by any process, for example a prepolymerisation in a liquid hydrocarbon or in gas phase in accordance with a batchwise, semicontinuous or continuous process. The catalyst or the prepolymer may be introduced in the reactor continuously or discontinuously, preferably continuously.

POLYMERISATION EXAMPLE 1

An industrial fluidised bed gas phase reactor having a diameter of 5 m was operated at 104 C temperature and 23 tiara pressure (with ethylene at a pressure of 7.3 bars). In the reactor was added ethylene, hexene (at a rate of 220 kg/hr), nitrogen and the polymerisation catalyst PQC24340® from P Q Corporation Catalysts (a chromium compound supported on a silica aluminium cogel containing 1% by weight of chromium and 2.0% by weight of aluminium) so that an ethylene-hexene-copolymer having a high load melt index of 10 g/10 min and a density of 950 kg/m3 was formed under steady state conditions (production rate of 34 T/hr and catalyst injection rate of 10.4 kg/h).

The transition from said PQC24340 to another PQ catalyst EP30X (a silica supported chromium catalyst containing 1% by weight of chromium) started with a gradual decrease of the rate of introduction of PQC24340, and a gradual increase of the rate of EP30X.

During the transition, the polymerisation production rate ("R") remained within +−10% of 34 T/hr, no additional release of ethylene from the reactor was made, no catalyst killer was used, and the polymerisation catalyst activity remained within +−10% of its activity during the steady state production of the copolymer PE-hexene.

The reactor bed height during the transition remained within +−10% of the reactor bed height just before the start of the transition (which was 20 m).

The reactor ethylene partial pressure during production with the first catalyst was stable around 7.3 bars; no action was taken to reduce it before or during the transition.

The total transition time duration was 30 hours.

After the transition, the new copolymer PE-hexene was produced under steady state conditions (production rate of 33 T/hr); said ethylene-hexene-copolymer had a high load melt index of 30 g/10 min and a density 953 kg/m3.

The above transition was successful and manageable despite the fact that it led to the formation of a significant amount of agglomerates (typically 50 kg/h during 10 h). which is not optimum.

POLYMERISATION EXAMPLE 2

In order to improve the plant performance, the above transition was repeated but with the addition of an optimisation control step performed just before the introduction of the second catalyst:

The ethylene partial pressure was reduced from 7.3 bar to 6.3 bar, this in anticipation of the slightly higher activity of the second catalyst system (EP30X). The impact on the production rate was a reduction of 3 to 4 Te/h before the change of catalyst feed.

This ethylene partial pressure reduction allowed performing the catalyst transition without any agglomerate formation during the transition and the subsequent return to steady state using the EP30X catalyst.

The invention claimed is:

1. Process for the transition T1 between an ethylene or a propylene polymerization process carried out in a polymerization reactor in the presence of a catalyst a1, ethylene or propylene and optionally an olefin co-monomer A1 to produce an ethylene polymer or a propylene polymer P1 into an ethylene or a propylene polymerization process carried out in the same polymerization reactor in the presence of a catalyst a2, ethylene or propylene and optionally an olefin co-monomer A2 to produce an ethylene polymer or a propylene polymer P2, wherein:
   the reactor is a gas phase fluidized bed reactor;
   catalyst a1 and a2 are different and compatible, and
      (i) where a chromium catalyst a1 is used as the catalyst for producing P1, the catalyst a2 for producing P2 will also be a chromium catalyst;
      (ii) if a Ziegler-Natta catalyst is used as the catalyst for producing P1, the catalyst for producing P2 will also be a Ziegler-Natta catalyst; and
      (iii) if a metallocene catalyst is used as the catalyst for producing P1, the catalyst for producing P2 will also be a metallocene catalyst;
   catalyst a1 and catalyst a2 are both active and present in the reactor during at least part of the transition T1 from P1 to P2;
   the transition T1 is performed continuously;
and further wherein
the mass of the polymer present in the reactor during the transition is at least 75% of the mass of the polymer just before the start of the transition; and
the transition includes an additional polymerization control step which takes place at the beginning of or towards the end of the transition T1 and which takes into account the intrinsic behavior of the respective polymerization catalyst a1 and a2 and which includes at least one action chosen amongst a decrease/increase of the main monomer partial pressure, a decrease/increase of the main monomer feed rate, a decrease/increase of the ratio of comonomer to main monomer, a decrease/increase of the rate of introduction of the co-catalyst, a decrease/increase of the rate of introduction of a catalyst activity improver, a decrease/increase of the partial pressure of hydrogen.

2. Process according to claim 1 wherein the polymerisation production rate ("R"), defined as the amount of polymer produced by unit of time (e.g. tons/hour), must fulfill the following equation $$0.55 \times R_{P1} < R_{T1} < 1.45 \times R_{P1}$$

wherein $R_{P1}$ is the steady state production rate of the polymer P1 just before the start of the transition T1, and $R_{T1}$ is the production rate of the polymer during the transition T1.

3. Process according to claim 1 wherein the polymerisation production rate must fulfill the following equation $$0.80 \times R_{P1} < R_{T1} < 1.20 \times R_{P1}.$$

4. Process according to claim 1 wherein no deinventorying of the reaction system content is operated during the transition T1.

5. Process according to claim 1 wherein the main monomer (ethylene or propylene) partial pressure (pMM) must fulfill the following equation $$0.55 \times pMM_{P1} < pMM_{T1} < 1.45 \times pMM_{P1}$$

wherein $pMM_{P1}$ is the main monomer partial pressure just before the start of the transition T1, and $pMM_{T1}$ is the main monomer partial pressure during the transition T1.

6. Process according to claim 1 wherein the main monomer partial pressure of the present invention must fulfill the following equation $$0.80 \times pMM_{P1} < pMM_{T1} < 1.20 \times pMM_{P1}.$$

7. Process according to claim 1 wherein the transition T1 is operated in the absence of injection in the reactor of a catalyst killer.

8. Process according to claim 1 wherein the polymerisation catalyst activity, defined as the amount of polymer produced by unit of time and by amount of catalyst in g/hour/g cata, must fulfill the following equations a. $0.55 \times A_{P1} < A_{T1} < 1.45 \times A_{P1}$ b. $0.55 \times A_{P2} < A_{T1} < 1.45 \times A_{P2}$ wherein $A_{P1}$ is the activity of the catalyst system a1 used for the production of the polymer P1 just before the start of the transition T1, $A_{P2}$ is the activity of the catalyst system a2 used for the production of the polymer P2 just after the end of the transition T1 and $A_{T1}$ is the catalyst activity of the catalyst system used during the transition.

9. Process according to claim 1 wherein the polymerisation catalyst activity must fulfill the following equations a. $0.80 \times A_{P1} < A_{T1} < 1.20 \times A_{P1}$ b. $0.80 \times A_{P2} < A_{T1} < 1.20 \times A_{P2}.$ 10. Process according to claim 1 wherein the presence of a co-monomer is mandatory and co-monomer A1 and co-monomer A2 are the same co-monomer.

11. Process according to claim 1 wherein the mass of polymer present in the reactor during the transition is at least 80% of the mass of polymer just before the start of the transition.

12. Process according to claim 1 wherein the main monomer is ethylene or propylene and the optional comonomer is selected from alpha-olefins having 2 to 12 carbon atoms.

13. Process according to claim 1 wherein the additional polymerisation control step takes place at the beginning of the transition T1.

14. Process according to claim 1 wherein the additional polymerisation control step takes place towards the end of the transition T1.

15. Process according to claim 1 wherein the mass of polymer present in the reactor during the transition is at least 90% of the mass of polymer just before the start of the transition.

16. Process according to claim 1 wherein the mass of polymer present in the reactor during the transition is at least 95% of the mass of polymer just before the start of the transition.

* * * * *